United States Patent
Ito et al.

[19]

[11] Patent Number: 5,959,694
[45] Date of Patent: Sep. 28, 1999

[54] VIDEO SIGNAL WITH CONTOUR ADJUSTMENT PROCESSING APPARATUS

[75] Inventors: Keiichi Ito; Hitoshi Nakamura, both of Kanagawa, Japan

[73] Assignee: Sony Corporation, Tokyo, Japan

[21] Appl. No.: 09/049,809

[22] Filed: Mar. 27, 1998

Related U.S. Application Data

[63] Continuation of application No. 08/634,434, Apr. 18, 1996.

[30] Foreign Application Priority Data

Apr. 21, 1995 [JP] Japan .................................. 7-096629

[51] Int. Cl.$^6$ .................................................. H04N 5/208
[52] U.S. Cl. ......................... 348/625; 348/630; 348/649; 348/253; 348/26
[58] Field of Search ................................ 348/26, 25, 28, 348/29, 30, 252, 253, 382, 622, 623, 625, 627, 630, 649, 652, 668; 382/266; H04N 11/00, 5/208

[56] References Cited

U.S. PATENT DOCUMENTS

| | | | |
|---|---|---|---|
| 4,081,836 | 3/1978 | Skinner | 348/627 |
| 4,386,434 | 5/1983 | Gibson | 348/630 |
| 4,506,293 | 3/1985 | Hurst, Jr. | 348/630 |
| 5,103,299 | 4/1992 | Asaida | 348/675 |
| 5,446,502 | 8/1995 | Lebowsky | 348/625 |
| 5,574,513 | 11/1996 | Topper | 348/630 |

*Primary Examiner*—Sherrie Hsia
*Attorney, Agent, or Firm*—Frommer Lawrence & Haug LLP; William S. Frommer

[57] ABSTRACT

An apparatus for processing a video signal by adjusting the contour of a picture. The apparatus includes an arrangement from a delay circuit 2 to a subtraction circuit 5 for extracting a contour of the picture and generating at least a signal opposite in polarity to a contour enhancement signal enhancing the extracted contour. The signal polarity is continuously varied from a maximum value of a positive polarity to a maximum value of an opposite polarity by a variable resistor RV2, an output of which is added to the input video signal by an addition circuit 6. With the processing apparatus, a picture can not only be raised in resolution as felt by the viewer, that is can be enhanced in contour, but also can be lowered in resolution as felt by the user, that is can be softened in contour. A corresponding method for processing a video signal by adjusting the contour of a picture and a video camera having the apparatus for processing the video signal in this manner are also disclosed.

12 Claims, 6 Drawing Sheets

VIDEO SIGNAL WITH CONTOUR ADJUSTMENT PROCESSING APPARATUS

This is a continuation of Application Ser. No. 08/634,434, filed Apr. 18,1996.

BACKGROUND OF THE INVENTION

1. Field of the Invention

This invention relates to a method and apparatus for processing video signals by adjusting the contour of a picture, and a video camera.

2. Description of the Related Art

Up to now, attempts have been made for enhancing sharpness of a picture for eking out insufficient characteristics in the high-frequency components of the spatial frequency of the optical or imaging devices by differentiating video signals in both the horizontal and vertical directions for extracting the contour in the horizontal and vertical directions for generating contour enhancement signals and for adding the contour enhancement signals to the original picture signals with a polarity of enhancing the contour of the picture represented by the original video signals.

FIG. 1 shows the basic arrangement of a conventional video signal processing apparatus for enhancing the contour represented by the original video signals. FIGS. 2A to 2H illustrate an example of waveform signals for illustrating the operation of various components of the arrangement shown in FIG. 1.

To a terminal 111 of video signal processing apparatus, shown in FIG. 1, a video signal S11, such as an imaging signal, shown in FIG. 2A, is supplied. The video signal S11, supplied to the terminal 111, is supplied to an input terminal of an addition circuit 114 and to an input terminal of a delay circuit 112.

The delay circuit 112 outputs the signal S11, supplied to its input terminal, after a delay equal to t1 shown in FIG. 2A. The signal delayed from the signal S11 by the delay circuit 112 is a signal S14 shown in FIG. 2D. This signal S14 is supplied to an input terminal of an addition circuit 116, an input terminal of a delay circuit 113 and to an input terminal of an amplifier 119. The signal amplified from the signal S14 by the amplifier 119 is a signal S15 shown in FIG. 2E. This signal S15 is supplied to a non-inverting input terminal of a subtraction circuit 115. The subtraction circuit 115 is comprised of a differential amplifier.

The delay circuit 113 outputs the signal S14 supplied to its input terminal with a delay equal to time t2 shown in FIG. 2A. The signal delayed by the delay circuit 113 is the signal S12 shown in FIG. 2B. The signal outputted by the delay circuit 113 is sent to the other input terminal of the addition circuit 114.

The addition circuit 114 sums the two signals S11, S12 supplied thereto to generate and output a signal S13 shown in FIG. 2C. The signal S13 obtained by the addition by the addition circuit 114 is supplied to the inverting input terminal of the subtraction circuit 115.

The subtraction circuit 115 performs subtraction of the signal S13 from the signal S15 to produce and output a signal S16 shown in FIG. 2F. This signal S16 corresponds substantially to the differentiated signal S11. The subtraction circuit 115 has its output terminal connected to a terminal of a variable resistor RV1 having its other terminal grounded. The signal S16 has its level adjusted to a pre-set level, as shown at a signal S17 in FIG. 2G, by being passed through the variable resistor RV1. The variable amount of the variable resistor RV1 corresponds to an amount of contour enhancement.

The addition circuit 116 sums the signal S14 from the delay circuit 112 to the signal S17 from the variable resistor RV. This enhances the contour of the signal S11 to give a signal S18 shown in FIG. 2H. The signal S18 is subsequently supplied from the terminal 117 to a downstream side circuit.

With the above-described contour enhancement, it is only possible to enhance the contour of the original picture represented by the original picture signal as compared to the contour of the original picture. Thus, for blurring the original picture, an optical filter has conventionally be employed. However, since it is possible with a given optical filter to blur the picture only to a pre-set extent, the contour weakening degree cannot be changed continuously.

Among the various sorts of contour enhancements, there is known such contour enhancement known as detail processing. This processing increases or decreases the amount of contour enhancement only of picture signals of a fixed color hue, such as skin hue. It is similarly not possible with the skin tone detail processing to weaken the picture contour.

SUMMARY OF THE INVENTION

It is therefore an object of the present invention to provide a video signal processing method and apparatus whereby the contour of the original picture can be rendered weaker than the contour of the original picture, and a video camera employing the picture signal processing method and apparatus.

In one aspect, the present invention provides an apparatus for processing a video signal including contour signal generating means for generating from the video signal a contour signal specifying the contour of a picture represented by the video signal, and mixing means for mixing the contour signal and the video signal in a polarity of at least attenuating the contour of the picture.

In another aspect, the present invention provides a method for processing a video signal including a contour signal generating step for generating from the video signal a contour signal specifying the contour of a picture represented by the video signal, and a mixing step for mixing the contour signal with the video signal in a polarity of at least attenuating the contour of the picture.

In still another aspect, the present invention provides a video camera having an imaging element for receiving the light of an optical image and generating a video signal corresponding to the optical image, contour signal generating means for generating from the video signal a contour signal specifying the contour of a picture represented by the video signal, and mixing means for mixing the contour signal with the video signal in a polarity of at least attenuating the contour of the picture.

According to the present invention, opposite polarity signals with respect to the contour enhancement signals are produced from the original video signals. If these signals are added to the original picture signals, an operation which is reverse of the contour enhancement operation, that is contour weakening operation, may be performed. In addition, if a color hue is detected and a signal for adjusting the contour of the original picture is generated responsive to the results of color hue detection, it becomes possible to adjust the contour only of the detected color hue.

DESCRIPTION OF THE PREFERRED EMBODIMENTS

Figure 1:
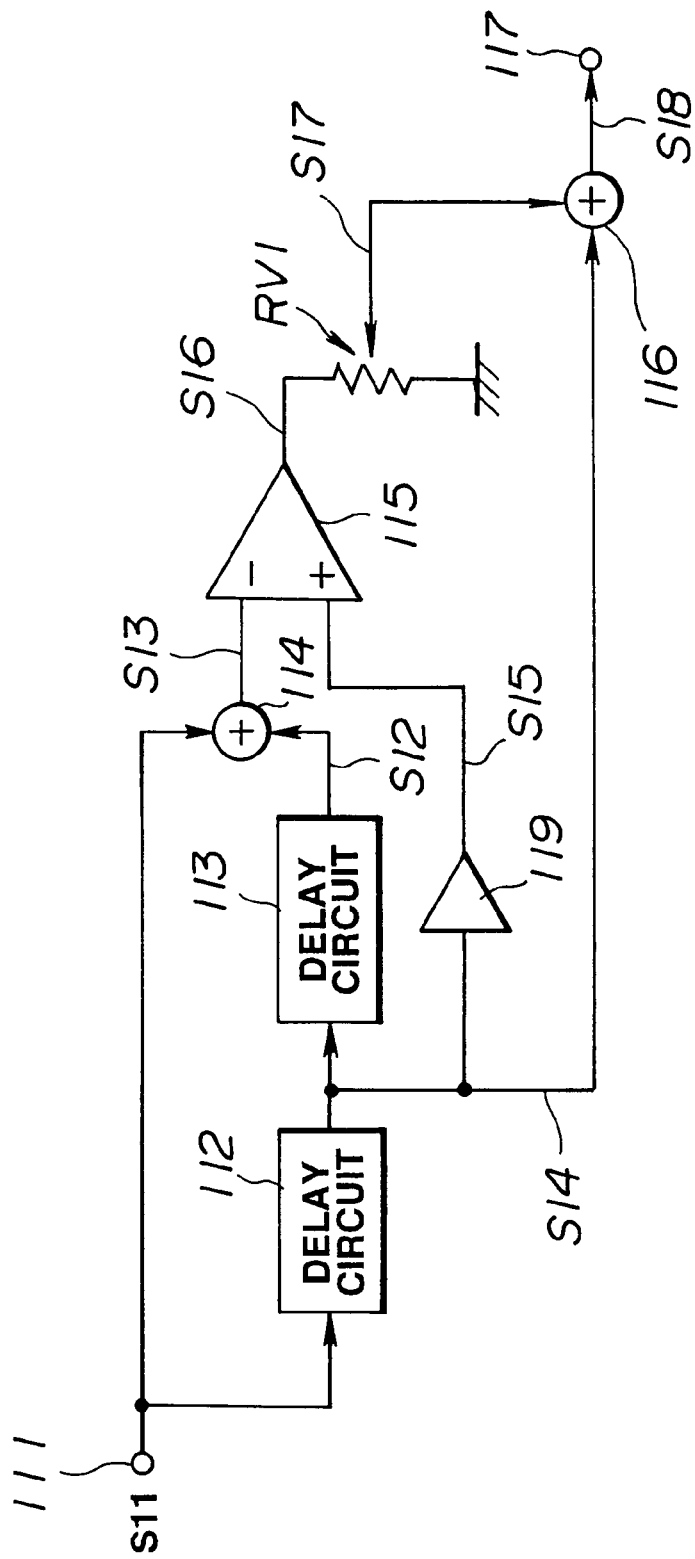
FIG. 1 is a block circuit diagram showing an arrangement of a conventional video signal processing apparatus.

Referring to the drawings, certain preferred embodiments of the present invention will be explained in detail.

Figure 3:
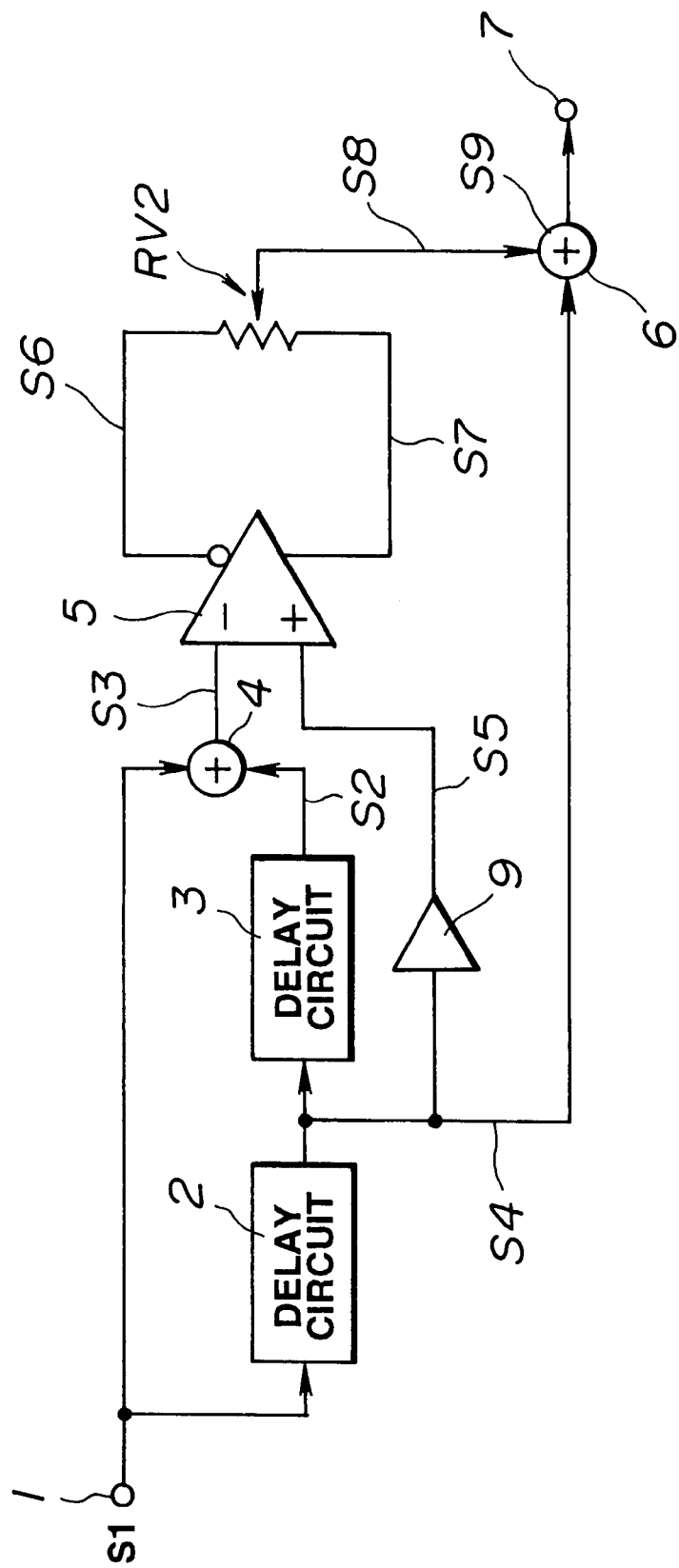
FIG. 3 is a block circuit diagram showing an arrangement of a video signal processing apparatus according to an embodiment of the present invention.

FIG. 3 shows an arrangement of a video signal processing apparatus, according to an embodiment of the present invention, in which the picture contour can be both weakened and intensified. In the embodiment of FIG. 3, only signal processing for the red signal S1 is shown for simplifying the drawing. However, the green signal or the blue signal among the color picture signals can be processed in a similar manner. FIGS. 4A to 4I show an example of waveform signals for illustrating the operation of various portions of the arrangement shown in FIG. 3.

Figure 4:
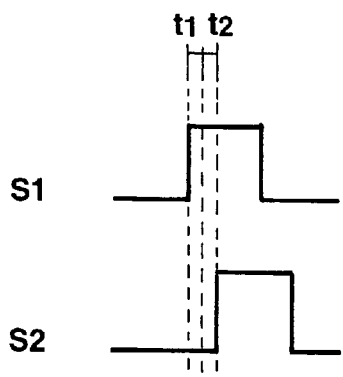
FIGS. 4A to 4I are waveform diagrams showing signal waveforms at various portions of the circuit of the embodiment shown in FIG. 3.

To a terminal 1 of the video signal processing apparatus, shown in FIG. 3, a video signal S1, such as an imaging signal, shown in FIG. 4A, is supplied. The picture signal S1, supplied to the terminal 1, is supplied to an input terminal of an addition circuit 4 and to an input terminal of a delay circuit The delay circuit 2 outputs the signal S1, supplied to its input terminal, after a delay equal to t1 shown in FIG. 4A. The signal delayed from the signal S1 by the delay circuit 2 is a signal S4 shown in FIG. 4D. This signal S4 is supplied to an input terminal of an addition circuit 6, an input terminal of a delay circuit 3 and to an input terminal of an amplifier 9. The signal amplified from the signal S4 by the amplifier 9 is a signal S5 shown in FIG. 4E. This signal S5 is supplied to a non-inverting input terminal of a subtraction circuit 5. The subtraction circuit 5 is comprised of a differential amplifier.

The delay circuit 3 outputs the signal S4 supplied to its input terminal with a delay equal to time t2 shown in FIG. 4A. The signal delayed by the delay circuit 3 is the signal S2 shown in FIG. 4B. The signal S2 outputted by the delay circuit 3 is sent to the other input terminal of the addition circuit 4.

The addition circuit 4 sums the two signals S1, S2 supplied thereto to generate and output a signal S3 shown in FIG. 4C. The signal S3 obtained by addition by the addition circuit 4 is supplied to the inverting input terminal of the subtraction circuit 5.

Figure 2:
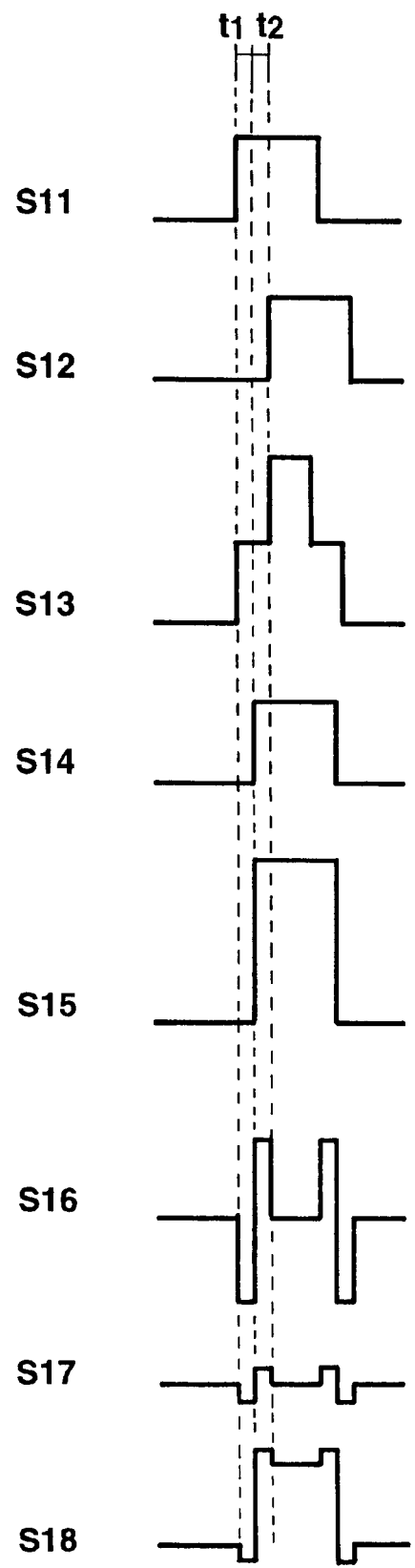
FIGS. 2A to 2H are waveform diagrams showing examples of signal waveforms at various portions of a conventional circuit.

The subtraction circuit 5 subtracts the signal S3 from the signal S5 to generate and output a positive polarity signal and its opposite polarity signal. The positive polarity signal is a signal S7 similar to the signal S16 shown in FIG. 2F, while the opposite polarity signal is a signal S6 shown in FIG. 4F. The signal S6 is an opposite polarity signal with respect to the signal S16 which is the differentiated signal S1. The subtraction circuit 5 has its positive polarity signal output terminal connected to a terminal of a variable resistor RV2 as variable means, while having its opposite polarity signal output terminal connected to the opposite terminal of the variable resistor RV2.

Thus a signal continuously changing from a maximum value of the positive polarity to a maximum value of the opposite polarity is produced at a variable output terminal of the variable resistor RV2 connected to an input terminal of the addition circuit 6.

Since the opposite input terminal 6 of the addition circuit 6 is connected to the output terminal of the delay circuit 2, the signal S4 from the delay circuit 2 is summed to the signal from the variable output terminal of the variable resistor RV2. If the variable resistor RV2 is adjusted so that the opposite polarity signal S6 becomes larger such that the signal outputted at the variable output terminal of the variable resistor RV2 is as shown at S8 in FIG. 4H, the output signal of the addition circuit 6 is as shown at S9 in FIG. 4I. This corresponds to the weakening of the contour represented by the video signal corresponding to the signal S1. If the variable resistor RV2 is adjusted so that the positive polarity signal S7 becomes larger, the contour of the picture represented by the video signal corresponding to the signal S1 is intensified. The output signal S9 of the addition circuit 6 is then supplied to a circuitry downstream of a terminal 7.

Thus, with the arrangement shown in FIG. 3, the signal from the variable output terminal of the variable resistor RV2 can be changed from the maximum positive value to the maximum value of the opposite polarity by varying the variable resistance value of the variable resistor. If the variable resistance value of the variable resistor is varied continuously from the maximum positive value to the maximum value of the opposite polarity, the contour of the original picture can be intensified, that is a picture with sharp contour may be produced, or alternatively, the contour may be oppositely processed, that is weakened.

Thus, with the present first embodiment, the contour of the original picture can not only be weakened from the contour of the original image but also be intensified, that is sharpened. In addition, since the contour may be weakened or intensified by acting on the resistance value of the variable resistor RV2, there is no necessity of employing an optical filter when it is desired to weaken the picture contour. Also, the degree of contour intensification or weakening can be changed continuously, so that the contour may be intensified or weakened to the extent desired by the viewer.

Since the signal of weakening the picture contour is the opposite polarity signal with respect to the contour enhancement signal generated by the conventional video signal processing apparatus, there is hardly any increase in the number of component parts from that of the conventional construction, with the result that the picture contour may be easily weakened at an extremely low cost.

Figure 5:
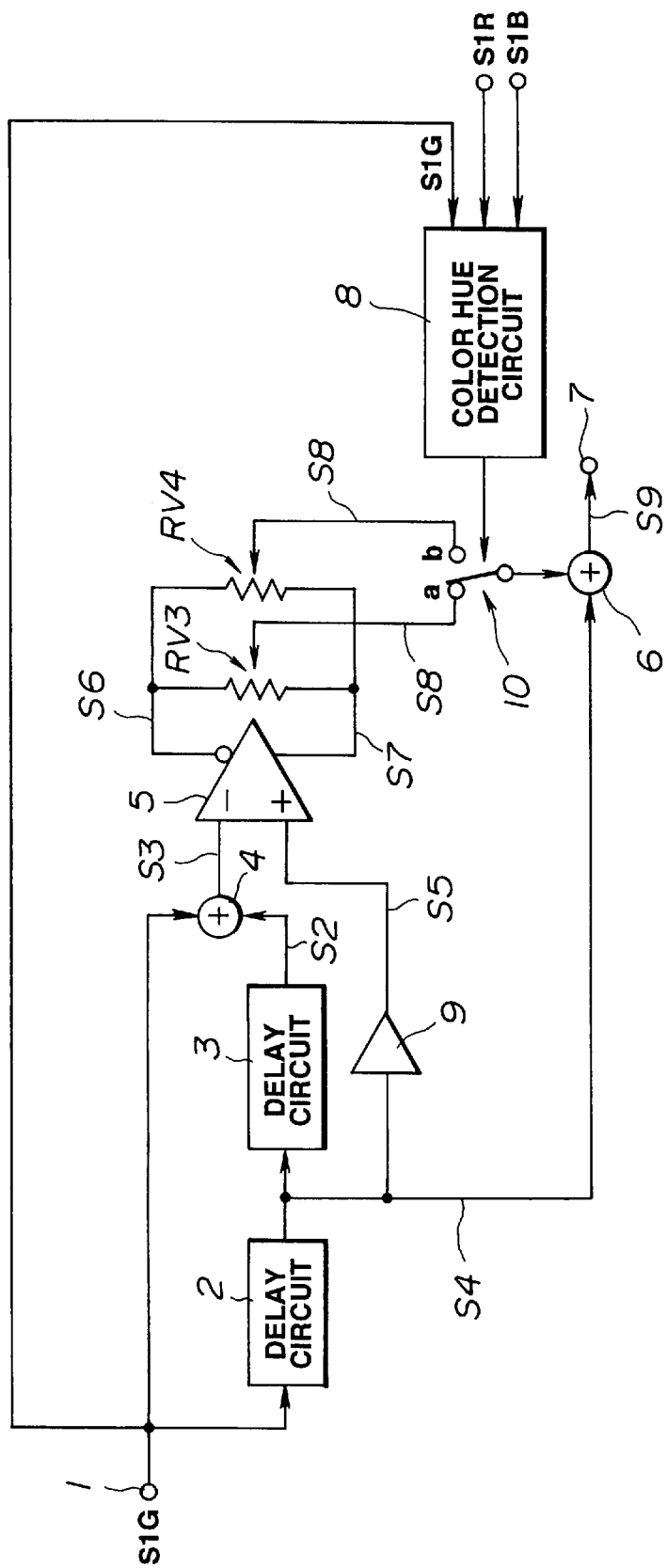
FIG. 5 is a block circuit diagram showing an arrangement of a video signal processing apparatus according to a modified embodiment of the present invention.

A modified arrangement of the present invention is explained by referring to FIG. 5, in which not only the contour of a picture area of a color hue can be weakened by also the contour of the picture area of the color hue can be intensified. In the arrangement of FIG. 5, the parts or components which are the same as those shown in FIG. 3 are denoted by the same reference numerals and the corresponding description is omitted for clarity.

In the embodiment of FIG. 5, only signal processing of the red signal SIG of the color video signals is shown for simplifying the illustration. However, the remaining signals, that is the green signal SIG or the blue signal SIB, may be processed similarly.

Referring to FIG. 5, the subtraction circuit 5 has its positive terminal signal output terminal connected to a terminal of a variable resistor RV3 and to a terminal of a variable resistor RV4, while having its opposite polarity signal output terminal connected to the opposite terminals of variable resistors RV3, RV4. Thus a signal S8 varied from the maximum positive value to the maximum value of the opposite polarity is produced from a variable output terminal of the variable resistor RV3 and a variable output terminal of the variable resistor RV4, respectively.

The variable resistor RV3 has its variable output terminal connected to a fixed contact a of a switch 10, while the variable resistor RV4 has its variable output terminal connected to its fixed contact b. The switch 10 is set to one of the fixed contacts a or b depending upon the switching control signal from a color hue detection circuit 8. The switch 10 has its output terminal connected to one of the inputs of the addition circuit The color detection circuit 8 is designed to detect an area of an optionally designated color hue from the red signal SIR, the blue signal SIB and the green signal SIG of the original color picture signal, and is designed to output the switching control signal corresponding to the result of detection of the color hue. Thus the switch 10 is set to the fixed contacts a or b when the color hue detection circuit 8 detects a color hue, such as a color hue A, or another color hue, such as a color hue B, respectively. The arrangement of the color hue detection circuit 8 is disclosed in a co-pending U.S. Application Ser. No. 08/539119, U.S. Pat. No. 5,640, 205, assigned to the present Assignee.

With the above-described arrangement of FIG. 5, if, when the color hue A is detected by the color hue detection circuit 8 so that the switch 10 is switched to the fixed contact a, an output signal of the variable output terminal of the variable resistor RV3 is changed from the maximum positive value to the maximum value of the opposite polarity, the contour of the picture region of the color hue A of the original picture may be strengthened, that is sharpened, or weakened. In addition, the degree of strengthening or weakening the contour can be changed continuously from the maximum positive value to the maximum value of the opposite polarity. On the other hand, if, when the color hue B is detected by the color hue detection circuit 8 so that the switch 10 is switched to the fixed contact b, an output signal of the variable output terminal of the variable resistor RV4 is changed from the maximum positive value to the maximum value of the opposite polarity, the contour of the picture region of the color hue B of the original picture may be strengthened, that is sharpened, or weakened, while the degree of strengthening or weakening the contour can be changed continuously from the maximum positive value to the maximum value of the opposite polarity.

Thus, with the present second embodiment, the contour of the picture regions of the color hues A or B of the original picture can not only be weakened from the contour of the original picture but also be intensified, that is sharpened. In addition, since the contour may be weakened or intensified by acting on the resistance values of the variable resistors RV3 and RV4, there is no necessity of employing an optical filter when it is desired to weaken the picture contour. Also, since the picture contour enhancement can be continuously changed depending upon the color hue as described above, the contour may be intensified or weakened to the extent desired by the viewer without regard to whether the contour is to be weakened or intensified.

If, in the present embodiment, the contour of only the picture region constituting the background is weakened, the result is akin to the depth of field becoming shallow. If, in the conventional skin detail processing, the amount of overall contour correction is small, there is no effect of detail processing in the decreasing direction of the amount of contour correction. However, sufficient effects may be achieved by carrying out picture signal processing of the present embodiment.

Figure 6:
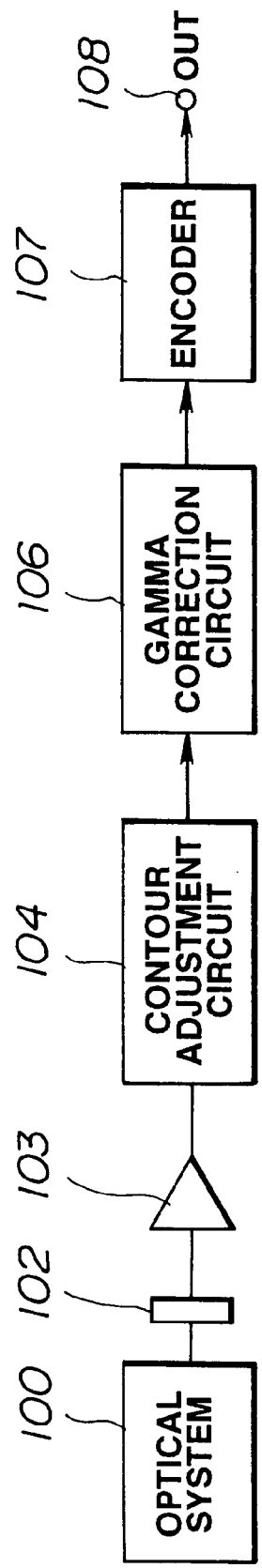
FIG. 6 is a block circuit diagram showing an overall arrangement of a color video camera employing the video signal processing apparatus of the present invention.

FIG. 6 shows an arrangement of a color video camera as an example of a camera for video signal processing employing the above-described embodiment of the video signal processing apparatus of the present invention.

Referring to FIG. 6, an optical system 100 is comprised of a lens system and a prism. The light rays incident from the lens system is separated by the prism into, for example, three prime colors of R, G and B. The light rays of R, G and B are incident on associated charge-coupled devices 102 so as to be converted thereby into corresponding electrical signals. In the embodiment of FIG. 6, only one solid-state device is shown for simplifying the illustration. The imaging signals from the charge-coupled devices 102 are amplified by a pre-amplifier 103 and thence supplied to a video signal processing apparatus 104 having the arrangement shown in FIGS. 3 or 5 for each of the R, G and B channels.

The video signal processing apparatus 104 performs video signal processing, explained in connection with the above embodiments, on the imaging signals supplied from the preamplifier 103.

The imaging signal, thus processed, are sent to a gamma processing circuit 106 for gamma processing, and thence supplied to an encoder 107 where the signal is converted into digital video signals which are outputted at an output terminal 108.

Thus, with the camera shown in FIG. 6, digital video signals are produced which are processed as described in the above-described first and second embodiments.

What is claimed is:

1. An apparatus for processing a video signal comprising:
contour signal generating means for generating from said video signal a contour signal specifying the contour of a picture represented by said video signal; and
mixing means for mixing said contour signal and said video signal and simultaneously outputting a first positive polarity signal and second opposite polarity signal as to least attenuate the contour of said picture.

2. The apparatus as claimed in claim 1 further comprising pre-set color hue area detection means for detecting an area of a color image represented by said video signal, said area having a color hue coincident with a preset color hue;
said mixing means mixing said contour signal only with the video signal in said area of the pre-set color hue.

3. The apparatus as claimed in claim 1 wherein said mixing means has adjustment means for adjusting the polarity of said contour signal from the first polarity of a predetermined amplitude to a second polarity of said predetermined amplitude and outputting an adjusted contour signal.

4. The apparatus as claimed in claim 3 further comprising pre-set color hue area detection means for detecting an area of a color image represented by said video signal, said area having a color hue coincident with a pre-set color hue;

said mixing means mixing said adjusted contour signal only with the video signal in said area of the pre-set color hue.

5. A method for processing a video signal comprising:

a contour signal generating step for generating from said video signal a contour signal specifying the contour of a picture represented by said video signal; and a mixing step for mixing said contour signal with said video signal and outputting simultaneously a first positive polarity signal and second opposite polarity signal as to least attenuate the contour of said picture.

6. The method as claimed in claim 5 further comprising a pre-set color hue area detection step for detecting an area of a color image represented by said video signal, said area having a color hue coincident with a pre-set color hue;

said mixing step mixing said contour signal only with the video signal in said area of the pre-set color hue.

7. The method as claimed in claim 5 wherein said mixing step has an adjustment step for adjusting the polarity of said contour signal from the first polarity of a predetermined amplitude to a second polarity of said predetermined amplitude and outputting an adjusted contour signal.

8. The method as claimed in claim 7 further comprising a pre-set color hue area detection step for detecting an area of a color image represented by said video signal, said area having a color hue coincident with a pre-set color hue;

said mixing step mixing said contour signal only with the video signal in said area of the pre-set color hue.

9. A video camera comprising:

an imaging device for receiving the light of an optical image and generating a video signal corresponding to said optical image;

contour signal generating means for generating from said video signal a contour signal specifying the contour of a picture represented by said video signal; and mixing means for mixing said contour signal with said video signal and simultaneously outputting a first positive polarity signal and second opposite polarity signal as to least attenuate the contour of said picture.

10. The video camera as claimed in claim 9 further comprising pre-set color hue area detection means for detecting an area of a color image represented by said video signal, said area having a color hue coincident with a pre-set color hue;

said mixing means mixing said contour signal only with the video signal in said area of the pre-set color hue.

11. The video camera as claimed in claim 9 wherein said mixing means has adjustment means for adjusting the polarity of said contour signal from the first polarity of a predetermined amplitude to a second polarity of said predetermined amplitude and outputting an adjusted contour signal.

12. The video camera as claimed in claim 11 further comprising pre-set color hue area detection means for detecting an area of a color image represented by said video signal, said area having a color hue coincident with a pre-set color hue; said mixing means mixing said contour signal only with the video signal in said area of the pre-set color hue.

* * * * *